No. 838,756. PATENTED DEC. 18, 1906.
E. R. SOLLIDAY.
APPARATUS FOR RECLAIMING WASTE RUBBER.
APPLICATION FILED MAY 1, 1906.
4 SHEETS—SHEET 1.
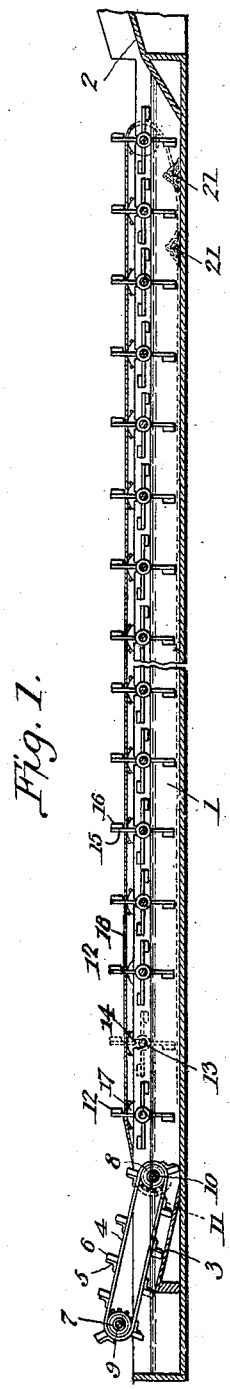
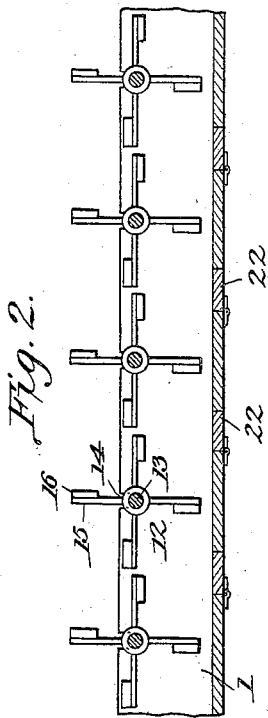
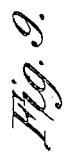
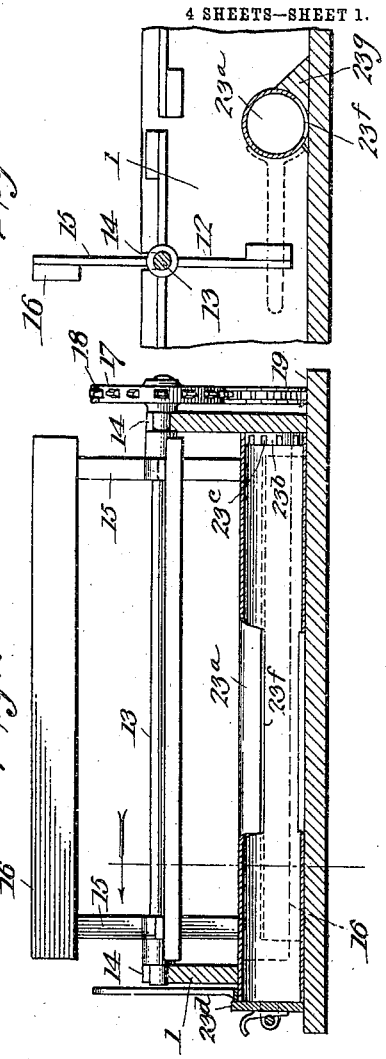
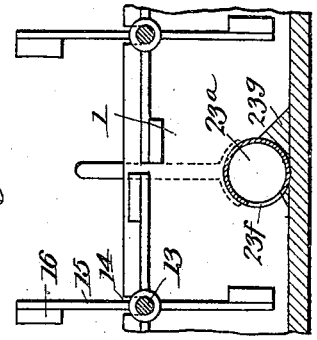
Witnesses: Inventor, No. 838,756. PATENTED DEC. 18, 1906.
E. R. SOLLIDAY.
APPARATUS FOR RECLAIMING WASTE RUBBER.
APPLICATION FILED MAY 1, 1906.
4 SHEETS—SHEET 2.
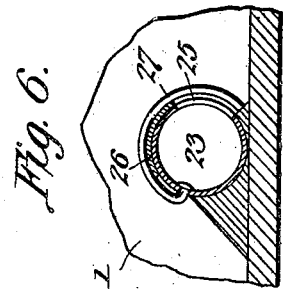
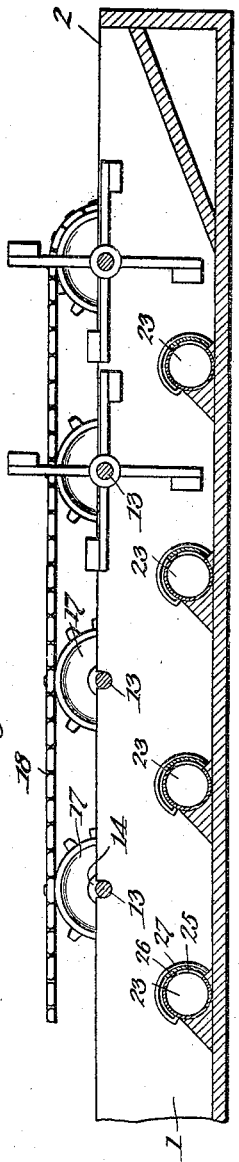
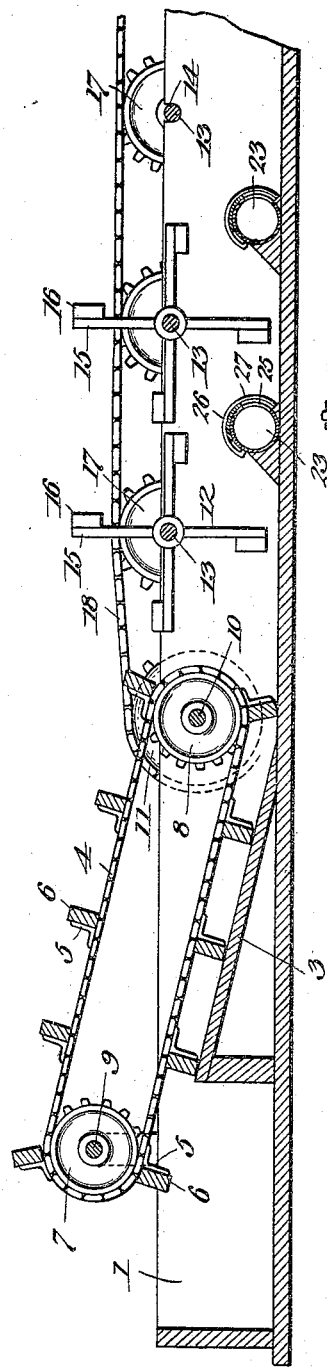
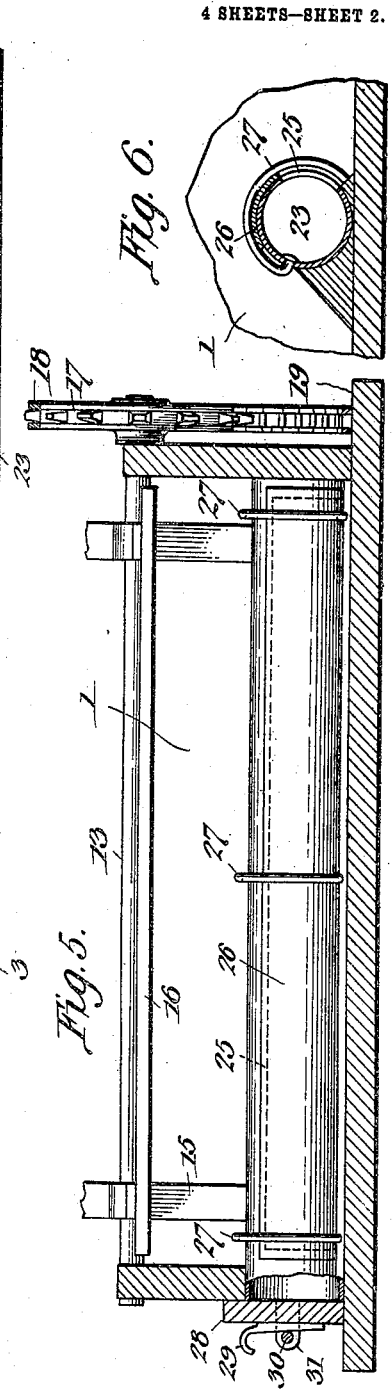

No. 838,756. PATENTED DEC. 18, 1906.
E. R. SOLLIDAY.
APPARATUS FOR RECLAIMING WASTE RUBBER.
APPLICATION FILED MAY 1, 1906.
4 SHEETS—SHEET 3.
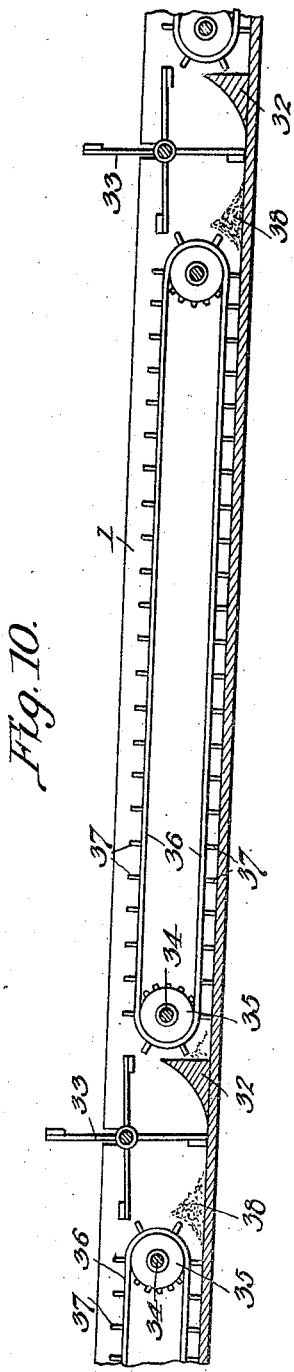
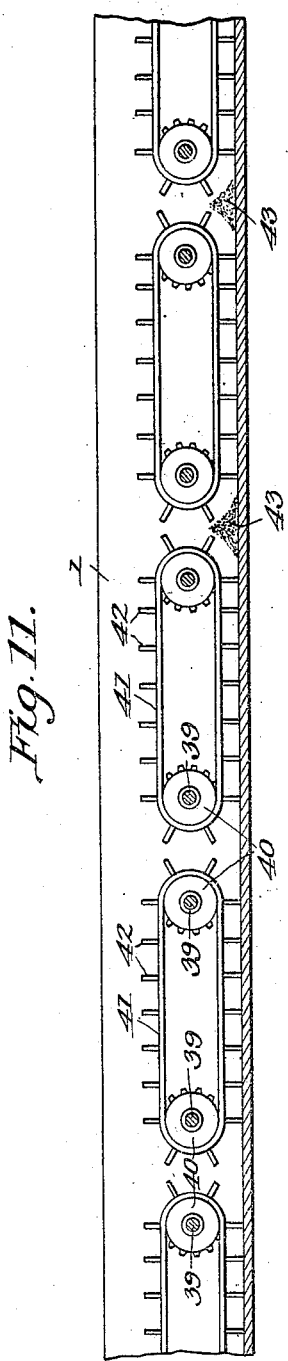
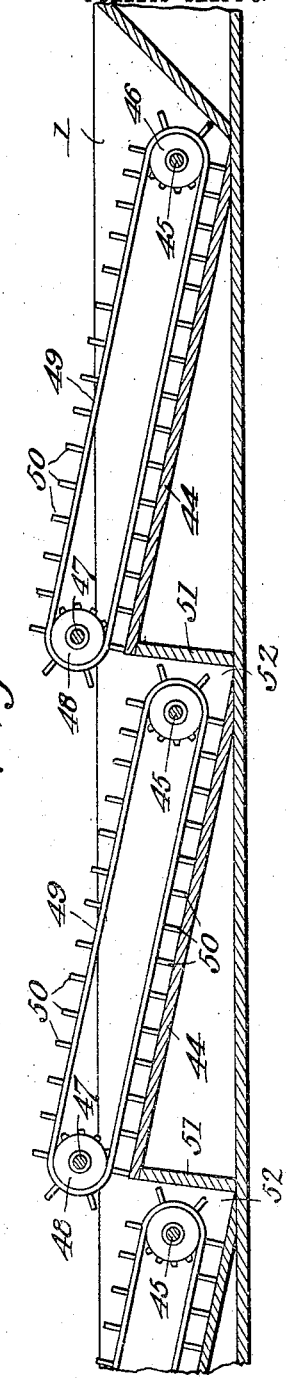
Witnesses:
Inventor,
Edward R. Solliday

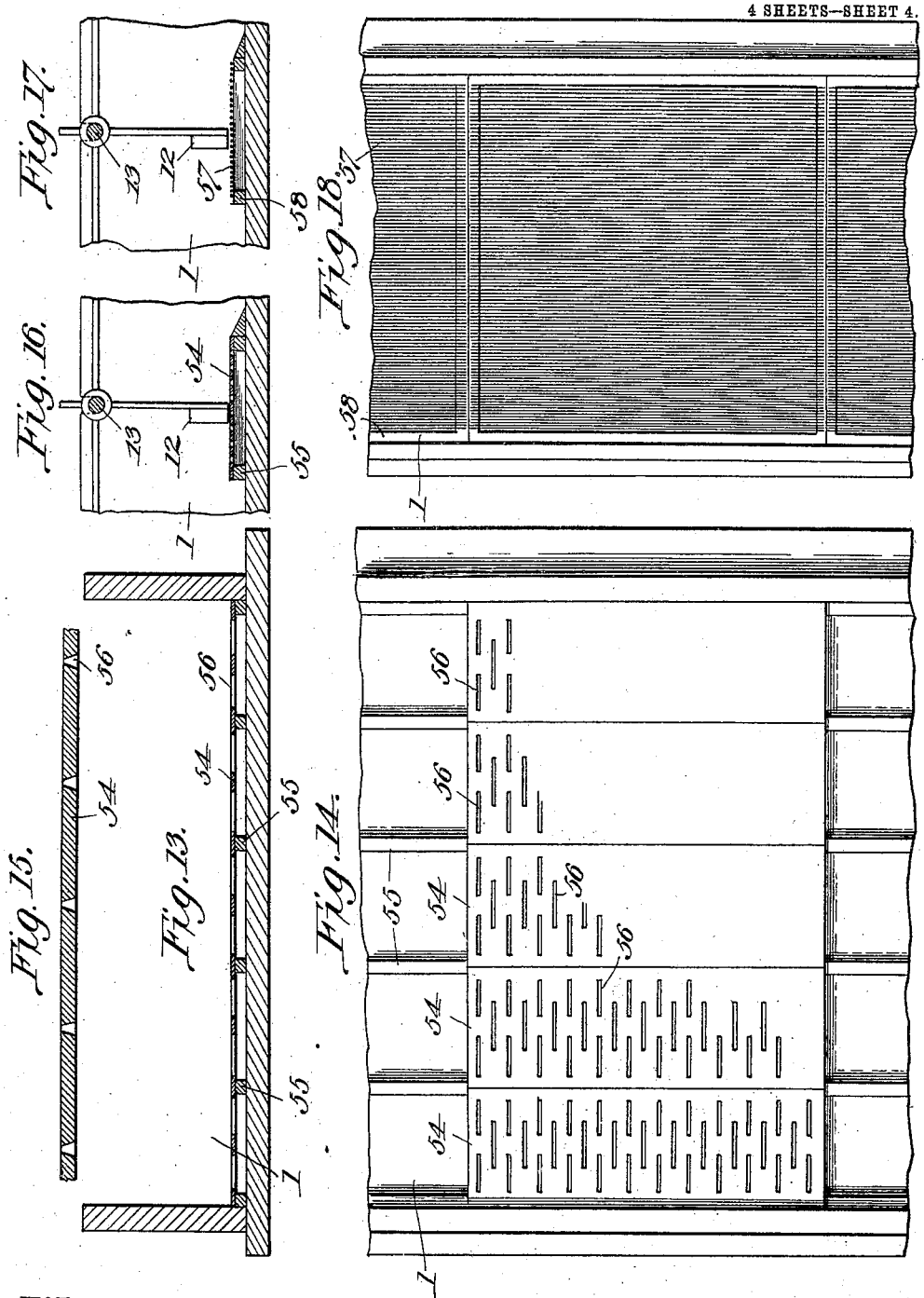

UNITED STATES PATENT OFFICE.

EDWARD R. SOLLIDAY, OF TRENTON, NEW JERSEY.

APPARATUS FOR RECLAIMING WASTE RUBBER.

No. 838,756.     Specification of Letters Patent.     Patented Dec. 18, 1906.

Application filed May 1, 1906. Serial No. 314,650.

*To all whom it may concern:*

Be it known that I, EDWARD R. SOLLIDAY, a citizen of the United States, residing at Trenton, in the county of Mercer and State of New Jersey, have invented certain new and useful Improvements in Apparatus for Reclaiming Waste Rubber; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to reclaiming waste rubber.

It has for its object to remove sand, metal, and other foreign substances from waste rubber after the same has been made into "cracked stock" or after the waste rubber has been ground or partially ground before or after the fiber has been wholly or in part mechanically separated from the waste rubber or after the stock has been treated chemically for the destruction of the fiber.

To such end the invention involves carrying the stock through a body of water by means of rotating paddle-wheels or their equivalent rotated at such speed as to permit particles of sand, metal, and other foreign substances to settle and deposit upon the floor of the water-trough at or adjacent to the paddle-wheels or their equivalent, from which the accumulation of sand, metal, and such particles of rubber as may be mixed therewith is removed, as may become necessary or desirable.

The preferred construction comprises a number of paddle-wheels disposed throughout the trough in proximity to each other, so that the sand, metal, and other foreign substances will settle and deposit on the bottom of the trough in the space between the paddle-wheels, together with such particles of rubber as may settle therewith.

It also comprises the provision of means for removal of the accumulations of deposit without the necessity of removing the paddle-wheels or their equivalent. Instead of paddle-wheels there may be employed endless scrapers passing around rolls or wheels, the flights or scrapers where they pass around the rolls or wheels serving the purpose and discharging the function of the paddle-wheels and at points between the rolls or wheels serving to move the stock through the trough, the deposit taking place between the rolls or wheels of the adjacent flight conveyers. The floor or bottom of the trough may be more or less inclined to have a fall or descent from the receiving end toward the discharge end of the trough or to have an ascent or rise from the receiving toward the discharge end of the trough, or it may be substantially level.

To the accomplishment of the foregoing and such other objects as may hereinafter appear the invention will now be described in its preferred as well as in some of its modified forms, and also its details, and then sought to be clearly defined by the claims, reference being had to the accompanying drawings, forming a part hereof, and in which—

Figure 1 is a longitudinal vertical section through a trough embodying one form of the invention; Fig. 2, a vertical longitudinal section of a portion of a trough, on a larger scale, showing hinged gates for removal of deposits; Figs. 3 and 4, vertical longitudinal sections of portions of a trough, showing deposit-removing tubes; Fig. 5, a vertical cross-section through the trough; Fig. 6, a vertical section through one of the deposit-removing tubes, on a larger scale, showing parts of the trough; Fig. 7, a vertical cross-section through a trough, showing a modified revolving form of deposit-removing tube, a portion of the tube being in section. Figs. 8 and 9 are vertical longitudinal sections through a portion of the trough, showing in Fig. 8 the tube in its open position and in Fig. 9 in its closed position. Figs. 10, 11, and 12 are vertical longitudinal sections showing diagrammatically modified forms of stock-moving carriers or devices. Fig. 13 is a vertical cross-section through a trough with a false bottom. Fig. 14 is a plan view of a portion of a trough, showing one set of false-bottom plates. Fig. 15 is a longitudinal section through one of the plates. Fig. 16 is a section of a portion of a trough, showing how the false-bottom plates may be set crosswise instead of lengthwise of the trough. Fig. 17 is a similar view showing the false bottom formed of frames with strands of wire, and Fig. 18 is a plan view of such a construction with the frames arranged longitudinally instead of transversely of the trough.

In the drawings the numeral 1 designates a trough of a suitable length, width, and depth, depending on the capacity for the work to be done and the bottom or floor of which may be substantially level or inclined more or less, although illustrated as substantially level, and which has an inclined chute 2 at its receiving end for the stock and at its opposite end with an endless-conveyer inclined platform 3, the conveyer consisting of sprocket-chains 4, connected together by angle-bars 5, provided with flights 6, preferably of wood, the chains passing around sprocket-wheels 7 and 8 on shafts 9 and 10, one of which shafts—for instance, shaft 10—may have a suitable drive-pulley. (Not shown.) Only one trough is illustrated; but there will be used as many as desired and arranged in any order desired, so that one will discharge into another as usual in this art. Within the trough 1 are suitably journaled a number of paddle-wheels 12, preferably by having their shafts 13 resting in open journal-boxes 14, so that when desired the paddle-wheels may be lifted out of place. These paddle-wheels are composed of side arms 15, connected together by blades 16 of any suitable form and material and set at the angle desired, although illustrated as made of wood. These paddle-wheels, as shown in Fig. 1, extend from one end of the trough to the other, although they may be otherwise arranged, and are quite close together, and each is provided with a sprocket-wheel 17 on its shaft, so as to derive motion from the sprocket-chain 18, which engages each wheel and the lower run of which may slide along a ledge 19 along the side of the trough, said sprocket-chain passing around a sprocket-wheel 11, which, for instance, may be on the shaft 10, from which it derives motion. The parts will be proportioned so that a slow rotation will be given to the paddle-wheels, sufficient merely to move the stock slowly through the trough. The trough will be filled with water to about the water-line indicated on the drawings.

The stock is fed into the receiving end of the trough and is moved through the trough and water by the paddle-wheels. In the space between the paddle-wheels the sand and metal and other foreign material contained in the stock will settle by gravitation, and as it accumulates therein it gradually assumes the ridge form illustrated by 21, extending from one side of the trough to the other, the ridge consisting of the sand, metal, and other foreign material and such particles of rubber as may settle with the foreign substances, and by the time the stock reaches the end of the last or finishing trough it will be practically free from such foreign particles and is discharged at the end of the trough by the ordinary endless carrier. When the accumulation of foreign matter is to be removed, access is had thereto by removal of one or more of the paddle-wheels.

While not absolutely necessary, yet it is preferred to provide means for removing the accumulation of foreign material and rubber mixed therewith without removing the paddle-wheels and without stopping the operation of the machine. For that purpose different means may be employed. For instance, the bottom of the trough at the points where the material accumulates may be provided with gates 22, hinged in any suitable manner so as to be dropped to allow the accumulated material to drop into a suitable receptacle that will be provided to receive it. The preferred means, however, consists of a tube 23, extended across the bottom of the trough at the points where the foreign material settles and accumulates. These tubes may be either stationary or revoluble and are each formed with an opening extending nearly the length thereof to receive the material from the side facing the moving stock. The tubes fit in concave-faced blocks 24, which form seats for the tubes. The tube 23, as illustrated, is a stationary tube having an opening 25 and provided with a sliding gate 26, which is guided in its movements by guards 27. The tube is closed at one end and open at the other, except as it is controlled at that end by a gate 28, which may be held in place by a wedge-key 29, fitting between the face of the gate and a rod 30, passing through keepers 31. The foreign material accumulates about the tube in the space between the paddle-wheels, and when to be removed the gate to the side opening in the tube is raised and the material passes into the tube, and after the gate is closed the end gate is opened and the material in the tube removed therefrom through the open end of the tube.

Instead of the stationary tube a revoluble tube 23$^a$ may be used, as illustrated in Figs. 7, 8, and 9. This tube has a solid stationary head 23$^b$ at one end, and its opposite end will be closed by a gate 23$^d$, similar to the gate to the stationary tube. The periphery of the head 23$^b$ is formed with recesses or notches 23$^c$, so that if any sand or foreign matter should work its way between the surface of the tube and periphery of the head it may in the rotation of the tube be worked into the recesses, so as not to interfere with the easy working of the tube. Normally the tube will have the opening 23$^f$ in its side next to the concave-faced block 23$^g$, so that no material can enter it. When the accumulated sand and metal or other foreign matter, including particles of rubber mixed with it, is to be removed, the tube is turned so as to bring its side opening next to the foreign material, when said material will be forced into the tube, after which the tube is turned to its closed position and the end gate opened, so as to take out the material.

In Fig. 10 is illustrated a modified form of the invention in which the trough is inclined and provided at suitable points with concave-faced blocks 32, which form dams for the water, at which points are located paddle-wheels 33. In the sides of the trough, adjacent to the paddle-wheels, are journaled shafts 34, which carry sprocket-wheels 35, around which pass sprocket-chains 36, carrying flights or blades 37, which serve to carry the stock from one paddle-wheel to the other, the portions of said carrier next to the paddle-wheels where the flights pass around the sprocket-wheels corresponding in function to the paddle-wheels and, together with the paddle-wheels, serving to act similarly to the series of paddle-wheels shown in Fig. 1 of the drawings, so as to allow the sand and metal and what rubber may be deposited therewith to settle and accumulate on the floor of the trough in the space between the flights of the carrier and the paddle-wheel, the accumulated material being designated by the numeral 38. The paddle-wheels and flight carrier will be slowly moved by sprocket-chains engaging sprockets on the shafts in a similar manner to that described for the construction shown in Fig. 1, or otherwise, and therefore not necessary to illustrate.

Another modified form, Fig. 11, consists in arranging within the trough 1 a number of flight carriers, each consisting of a set of shafts 39, provided with sprocket-wheels 40, around which pass sprocket-chains 41, provided with paddles or flights 42. The adjacent ends of the flight carriers correspond in function to the adjacent paddle-wheels in the preferred form of the device, and the sand and metal and other material mixed therewith will deposit on the trough-floor in the space between the adjacent ends of the flight carriers, the accumulated material being designated by the numeral 43. The flights serve to carry the stock through the trough similarly to the paddle-wheels of the first form described. It will thus be observed that the carrier-flights are a modified form of the paddle-wheels. These carrier-flights will be slowly moved by sprockets and chains connecting the several shafts at the outside of the trough similarly to the paddle-wheels, and illustration of such means is therefore unnecessary.

Another modified form is illustrated in Fig. 12 of the drawings. In this form the trough is provided with a number of inclined platforms 44, ascending in the direction of the movement of the stock. At the lower end of each platform is a shaft 45, carrying sprocket-wheels 46, and at the upper end a shaft 47, carrying sprocket-wheels 48. From the lower to the upper sprocket-wheels and around the same pass sprocket-chains 49, which are provided with paddles or flights 50, which serve to carry the stock from the bottom to the top of the platform and discharge it into another compartment of the trough at the lower end of the next platform. The water-line is indicated on the drawings. The trough is divided by vertically-inclined partitions 51 into compartments, one for each flight conveyer and substantially the length of the conveyer. In this form the sand and metal will deposit and accumulate at the lowermost end of each compartment at the point where the lower end of one flight conveyer lies below the upper end of the preceding flight conveyer—that is, at the point 52. By such arrangement, by reason of the flights at the adjacent ends of the conveyers moving in opposite directions, the stock is opened up, so that the sand and metal has an opportunity to separate from the stock and deposit at the bottom of the trough below the oppositely-traveling flights of the conveyers. These flight conveyers may be revolved or caused to travel by means of chain and sprockets, as described and illustrated for the form shown in Fig. 1, or otherwise, and therefore need not be illustrated in detail.

While a sprocket-and-chain drive is sufficient, yet any other well-known form of drive-gearing may be employed without departing from the invention. Any number of troughs may be employed, and they may be arranged in any of the well-known ways for one trough to deliver its contents into another trough, and as the same does not constitute the invention the same does not need to be illustrated.

The deposits of sand, metal, and particles of rubber mixed therewith which are removed from the last or finishing trough may again be passed to the first, second, or third trough, so as to separate the rubber stock from the sand and metal.

The trough and revolving paddle-wheels or flight conveyers may be of any proportions to best suit the purposes. It has been found that a trough about seventy-five feet long, four feet wide, and fourteen inches in depth, with paddle-wheels having a diameter of twenty-four inches and blades with a depth of about two and one-half inches, with thirty-two paddle-wheels in the trough making about six revolutions per minute and with the paddles in their lowest position about one half an inch from the bottom of the trough and a water depth of about eleven inches, in actual practice give most satisfactory results. The proportions, however, may be varied without departing from the invention.

If so desired, the bottom of the trough, whether on the level or incline, may be provided with a false bottom formed of apertured or slotted metal, or otherwise, for the passage of the fine sand onto the bottom proper of the trough. These plates will preferably be formed in sections, so as to be readily removed when desired, and in case they be used with the endless flight or scraper type they will extend the whole length of the trough; but when used with the paddle-wheel type they may be located beneath the paddle-wheels only.

In Fig. 13 is illustrated a portion of a trough provided with a false bottom composed of plates 54, supported above the bottom proper by strips 55—say about one inch in thickness—and if in sections each section in practice may be twelve by thirty inches in area. The plates are formed with apertures or slots 56, which in cross-section are preferably one sixty-fourth of an inch at the top and one thirty-second of an inch at the bottom, so as to allow particles of fine sand and rubber to pass through without clogging.

In Fig. 16 the plates are illustrated as under the paddle-wheel only, the slots in the plates running parallel with the shaft of the wheel, the plate under each wheel being in practice twelve inches wide and in length the width of the trough, or substantially so.

Instead of using perforated plates the false bottom may be formed of wires 57, stretched across a suitable frame 58 (see Figs. 17 and 18) of suitable dimensions. For instance, each frame may be four feet square in a trough having the endless flight or scraper type or twelve inches wide and four feet long in the paddle-wheel type. The wires may run lengthwise of the trough or crosswise thereof, as preferred or found best for the work in hand. They may be drawn more or less taut and in contact or spaced apart, so as to permit fine sand to pass through between the wires. If in contact, the pressure of the flights or blades against the wires may cause temporary spaces to exist between the wires for the passage of the fine sand.

Having described my invention and set forth its merits, what I claim is—

1. An apparatus for removing sand, metal and other foreign substances from waste rubber, comprising a trough for containing water, and revolving members carrying blades or flights, working in proximity to the bottom of the trough, to move stock through the trough, and arranged in relation to each other to leave spaces at the bottom of the trough between adjacent members for the deposit of sand and metal and other substances settling by gravitation, the blades of one member moving in the opposite direction to the blades of the other member where they describe their arc of rotation adjacent to each other, substantially as described.

2. An apparatus for removing sand, metal and other foreign substances from waste rubber, comprising a trough for containing water, and revolving members carrying blades or flights, working in proximity to the bottom of the trough, to move stock through the trough and arranged to deliver stock from one member to the member in advance thereof and to leave spaces at the bottom of the trough between adjacent members for the deposit of sand and metal and other substances, the blades of one member moving in the opposite direction to the blades of the other member where they describe their arc of rotation adjacent to each other, substantially as described.

3. An apparatus for removing sand, metal and other foreign substances from waste rubber, comprising a trough for containing water, revolving members carrying blades or flights for moving stock through the trough, and valve-controlled means for the removal of the deposits of sand, metal and other substances from the bottom of the trough, substantially as described.

4. An apparatus for removing sand, metal and other foreign substances from waste rubber, comprising a trough for containing water, revolving members carrying blades or flights for moving stock through the trough, and a tube extended across the bottom of the trough and having a valved opening for the removal of deposits of sand, metal and other substances from the trough, substantially as described.

5. An apparatus for removing sand, metal and other foreign substances from waste rubber comprising a trough for containing water, revolving members carrying blades or flights for moving stock through the trough, a revoluble tube extending across the bottom of the trough and having an opening for the removal of sand, metal and other substances from the trough, and a concave-faced seat for said tube, substantially as described.

6. An apparatus for removing sand, metal and other foreign substances from waste rubber comprising a trough for containing water, and revolving paddle-wheels having their blades working in proximity to the bottom of the trough, for moving stock through the trough, said wheels being arranged in proximity to each other to leave spaces between adjacent paddle-wheels for the deposit of sand, metal and other substances in the bottom of the trough between said wheels, substantially as described.

7. An apparatus for removing sand, metal and other foreign substances from waste rubber comprising a trough for containing water, revolving members carrying blades or flights working in proximity to the bottom of the trough to move stock through the trough, said members being arranged in relation to each other to leave spaces between them adjacent to the bottom of the trough for the deposit of sand, metal and other substances on the bottom of the trough between said members, the blades of one member moving in the opposite direction to the blades of the other member where they describe their arc of rotation adjacent to each other, and an endless flight conveyer for delivering stock from the trough, substantially as described.

8. An apparatus for removing sand, metal and other foreign substances from waste rubber comprising a trough for containing water, revolving paddle-wheels, arranged in proximity to each other for moving stock through the trough and permitting the deposit of sand, metal and other substances between the wheels, tubes extending across the bottom of the trough and having valved openings for the removal of the deposits of sand, metal and other substances, and an inclined endless flight conveyer for delivering the stock from the trough, substantially as described.

9. An apparatus for removing sand, metal and other foreign substances from waste rubber, comprising a trough for containing water, revolving members carrying blades or flights to move stock through the trough and arranged to deliver stock from one member to the member in advance thereof, with spaces between adjacent members for the deposit of sand, metal and other substances, and a false bottom to the trough formed with elongated openings, substantially as described.

In testimony whereof I affix my signature in presence of two witnesses.

EDWARD R. SOLLIDAY.

Witnesses:
J. C. ROE,
G. SEYFFERT.